US009813872B2

(12) United States Patent
Duteil et al.

(10) Patent No.: US 9,813,872 B2
(45) Date of Patent: Nov. 7, 2017

(54) METHOD AND DEVICE FOR EXTENDING DETECTION SURFACES INTERFACING A PLURALITY OF MOBILE ENTITIES WITH A COMPUTER SYSTEM

(71) Applicant: EPAWN, Paris (FR)

(72) Inventors: Christophe Duteil, Paris (FR); Laurent Chabin, Asnieres sur Seine (FR); Valentin Lefevre, Puteaux (FR)

(73) Assignee: STARBREEZE PARIS, Paris (FR)

( * ) Notice: Subject to any disclaimer, the term of this patent is extended or adjusted under 35 U.S.C. 154(b) by 0 days.

(21) Appl. No.: 15/394,302

(22) Filed: Dec. 29, 2016

(65) Prior Publication Data

US 2017/0195851 A1 Jul. 6, 2017

(30) Foreign Application Priority Data

Dec. 30, 2015 (FR) ..................... 15 63477

(51) Int. Cl.
*H04W 4/02* (2009.01)
*H04L 29/08* (2006.01)
*H04W 8/26* (2009.01)

(52) U.S. Cl.
CPC ........... *H04W 4/025* (2013.01); *H04L 67/303* (2013.01); *H04W 8/265* (2013.01)

(58) Field of Classification Search
CPC ...... H04W 4/025; H04W 8/265; H04L 67/303
See application file for complete search history.

(56) References Cited

U.S. PATENT DOCUMENTS

| 2006/0246403 | A1 | 11/2006 | Monpouet et al. |
| 2012/0270605 | A1* | 10/2012 | Garrone ............ H04M 1/72563 455/566 |
| 2013/0157690 | A1 | 6/2013 | Lefevre et al. |
| 2014/0365154 | A1* | 12/2014 | Moore ................... G01C 17/38 702/92 |

FOREIGN PATENT DOCUMENTS

| EP | 0347396 A1 | 12/1989 |
| FR | 2860985 A1 | 4/2005 |
| FR | 2964479 A1 | 3/2012 |

OTHER PUBLICATIONS

French Search Report, dated Sep. 16, 2016, from corresponding French Application.

* cited by examiner

*Primary Examiner* — Brandon Miller
(74) *Attorney, Agent, or Firm* — Young & Thompson

(57) ABSTRACT

A control method, in a system including a detection surface interfacing a plurality of mobile entities with a computer system, the detection surface including a plurality of elementary detection surfaces forming groups and sub-groups, wherein at least one mobile entity is registered with management modules of at least two different sub-groups, a period of time reserved for the at least one mobile entity registered with management modules of at least two different sub-groups, enabling the activation of at least one mobile entity, being the same in each of the at least two sub-groups.

20 Claims, 9 Drawing Sheets

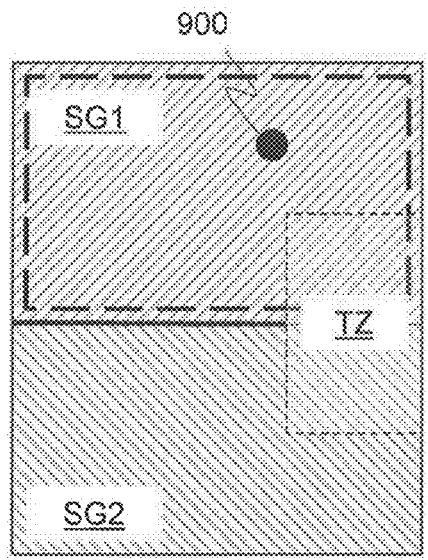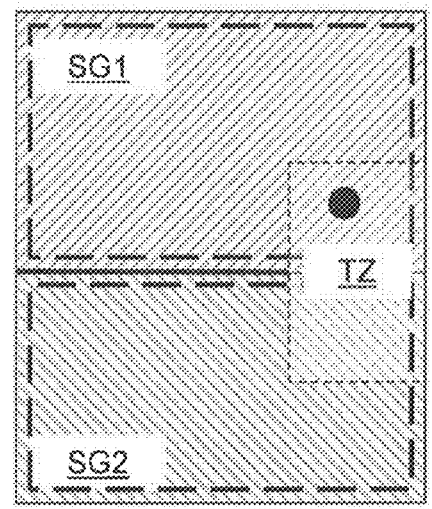
Fig. 9a
Fig. 9b
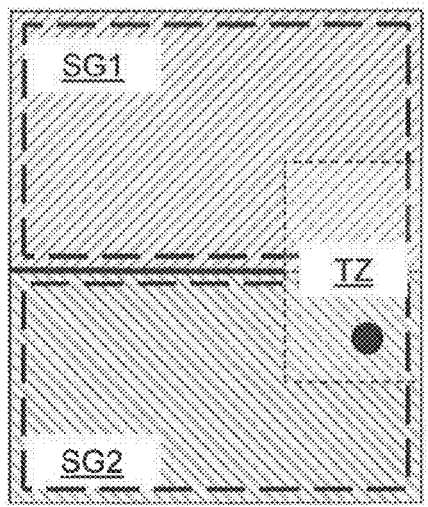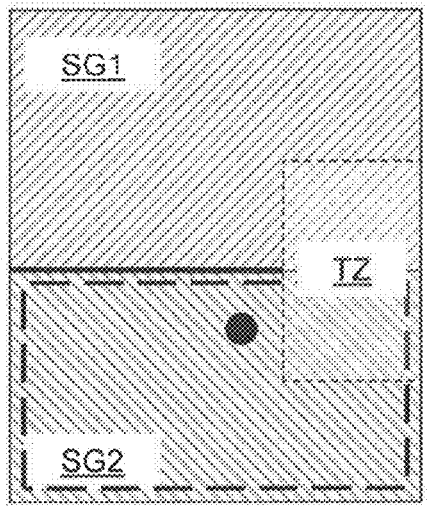
Fig. 9c
Fig. 9d

METHOD AND DEVICE FOR EXTENDING DETECTION SURFACES INTERFACING A PLURALITY OF MOBILE ENTITIES WITH A COMPUTER SYSTEM

The present invention concerns the interfaces between mobile objects and a computer system, in particular in the field of the tracking of persons in a predetermined environment, and more particularly a method and a device for extending detection surfaces interfacing a plurality of mobile entities with a computer system.

In numerous situations, it may be necessary, for a computer system, to detect the position and/or the orientation of mobile entities to enable the latter to react accordingly. Thus, for example, in virtual reality applications enabling an environment viewed by several users to be enhanced, the application implemented by the computer system must know the position of all the users, to compute a two-dimensional representation of a three-dimensional object, typically based on a position and an orientation, for each user, in order to add this representation to the scene viewed by each of the users.

Different technologies exist for detecting the position and/or the orientation of real objects on detection surfaces making it possible to use those objects as interfaces for computer systems.

Thus, for example, the inventors have previously developed a method and devices for interfacing a plurality of mobile entities with a computer system. This method and these devices have been the subject of a patent application which led to patent FR 2 964 479.

In accordance with the invention described in that document, the mobile entities are provided with one or more location modules and an activation module making it possible to determine the position and, preferably, the orientation, of each mobile entity, sequentially. The sensing of the positions of mobile entities is performed here by electromagnetic field. For these purposes, a detection surface for detecting positions of the mobile entities, composed of a mesh of row/column electromagnetic sensing type, is used. It is associated with an electronic module capable of computing, by demultiplexing, the position of a location module emitting an electromagnetic field.

Each location module is thus selected sequentially, according to an identifier specific to it, in order for it to emit an electromagnetic field. A position detection driver module is associated with the detection surface in order to sequentially activate the electromagnetic emissions of the location modules via a control signal.

The positions detection surface is, for example, a PCB type board (PCB standing for Printed Circuit Board) for electromagnetic reception, which may be flexible or rigid.

FIG. 1 illustrates an example of a detection surface and of associated logic.

The detection surface 1100 is here constituted by a mesh in the form of rows and columns constituting a conductive grid. The latter comprises a set of conductive loops along two orthogonal axes. Each loop is a discreet sensor making it possible to measure the intensity of the current or the voltage induced by a radiating element, typically a solenoid belonging to a mobile entity of which the position and/or the orientation are to be computed, which is positioned on the detection surface.

By way of illustration, it is considered here that a solenoid is placed in position 105, that is to say at the intersection of the loops 110 and 115 of which one end is connected to a ground and the other end is connected to the electronic components used to compute a position. When the solenoid situated at position 105 is powered, it generates an inductive current in the loops 110 and 115 which may be analyzed and compared with the current induced in the other loops. It is thus possible, by inductive coupling between the solenoid and the grid and by measurement of the induced current, to determine the solenoid position.

Multiplexers 120 and 125 are connected to each loop of each of the two axes of the grid, that is to say here to each of the vertical and horizontal loops, respectively. The outputs from the multiplexers 120 and 125 are connected to the automatic gain controllers (AGCs) 130 and 135, respectively, of a driver module for position sensing and detection, referenced 140-1, of a hardware module 140. The output signals from the automatic gain controllers 130 and 135 are first of all demodulated in the demodulators 145 and 150, respectively. The demodulation produces a direct current (or DC) signal proportional to the original sinusoid made up with alternating current (or AC) components that are multiples of the fixed frequency emitted by the solenoid.

A computing module 140-2 of the hardware module 140 here drives the multiplexers 120 and 220 in order to sequentially activate the loops, that is to say to activate a loop n+1 after a loop n. When the last loop has been reached, the processor initiates a new cycle and controls the activation of the first loop.

As illustrated, a band-pass filter is employed here in each automatic gain controller 130 and 135 to eliminate the undesirable harmonics from the demodulated signal as well as the electromagnetic background noise. This filtering makes it possible to refine the measurements of the signals coming from the multiplexers 120 and 125, which are demodulated in the demodulators 145 and 150 then digitized in the analog/digital converters (ADCs) 155 and 160, respectively.

The digital values obtained are sent to the central processing unit (CPU) 165 of the computing module 140-2 to be stored in memory. As illustrated, the central processing unit 165 controls the demodulators 145 and 150.

After the values have been stored in memory, the central processing unit increments the address of the multiplexers in order to carry out the digitization of the signals coming from the following loops. When a last loop has been attained, the central processing unit reinitializes the address of the multiplexer corresponding to the value of the first loop of the axis considered.

At the end of a cycle, the central processing unit has stored in memory, for each axis, the same number of digital values as there are adjacent loops close to the position of the solenoid. Based on these values, the central processing unit computes the position of the solenoid by interpolation as described below.

The control module for position sensing and detection 140-1 here comprises an emitter 170, controlled by the central processing unit 165 of the computing module 140-2, enabling a location module of a mobile entity to be activated.

Thus, to estimate the position of a set of location modules, it is necessary to sequentially activate each location module and, for each of these activations, according to the embodiment described here, to perform a cycle on each set of loops.

FIG. 2 diagrammatically illustrates the physical principle of inductive coupling between a solenoid and a conducting loop of a detection surface.

Each mobile entity of which the position and/or the orientation are to be computed comprises at least one solenoid of which the axis is, preferably, oriented towards the detection surface.

The solenoid 200 is passed through by an alternating current and emits an electromagnetic field which propagates towards the detection surface, in particular, in this example, towards the loop 115. The loop 115, receiving an electromagnetic field coming from the solenoid 200, couples with the solenoid 200. It is then possible to measure an alternating current signal at the terminals of that loop, referenced 205.

The coupling between the solenoid 200 and the loop 115 may be expressed in the form of the following relationship, $$R = \frac{k}{D^2} E$$

wherein E designates the voltage at the terminals of the solenoid 200, R designates the voltage of the signal received at the terminals 205 of the receiving loop 115, D is the distance between the solenoid 200 and the receiving loop 115 and k is a constant linked to intrinsic factors of the system comprising the solenoid and the receiving loop, in particular the number of turns of the solenoid and the size of the loop.

FIG. 3 diagrammatically illustrates an interpolation mechanism making it possible to compute the position of a solenoid placed on a detection surface, according to a given axis, based on the measurements obtained by a system such as that described with reference to FIG. 1.

It is assumed here that the solenoid is situated in the vicinity of vertical loops B3, B4 and B5, positioned according to the x-coordinates X3, X4 and X5, the voltages measured at the terminals of the loops being denoted V3, V4 and V5, respectively. The solenoid is to be found here at a position, along the x-axis, denoted XS.

The coordinates X3, X4 and X5 may be obtained by the central processing unit from an identifier of the corresponding loop (these values are predefined according to the routing diagram of the detection surface and, preferably, are stored in a non-volatile memory).

The portion of curve 300 represented in FIG. 3 illustrates the variation in voltage for the position XS of the solenoid according to the positions of the loops coupled with the solenoid, extrapolated from the values measured by the loops B3, B4 and B5. It may be assimilated to a quadratic function of parabolic type. This local approximation corresponds, in practice, to the phenomenon of electromagnetic coupling between a solenoid and loops of a conductive grid.

The following relationships illustrate this property.

$$V3 = a(X3 - XS)^2 + b$$

$$V4 = a(X4 - XS)^2 + b$$

$$V5 = a(X5 - XS)^2 + b$$

in which a and b are constants, a being a constant less than zero (a<0).

Furthermore, given the assumption of a quadratic function, the relationships between the x-coordinates X3, X4 and X5 may be expressed in the following form, $$X4 - X3 = X5 - X4 = \Delta X$$

$$X5 - X3 = 2\Delta X$$

($\Delta X$ representing the distance between the x-coordinates X3 and X4 and between the x-coordinates X4 and X5).

It is thus possible to interpolate the position of the solenoid according to the following formula:

$$XS = X3 + \frac{\Delta X}{2} \frac{3V3 - 4V4 + V5}{V3 - 2V4 + V5}$$

It is also possible, according to the same logic, to determine the position of the solenoid according to the y-axis.

Furthermore, the distance between the solenoid and the loop (that is to say the altitude of the solenoid relative to the detection surface) may be defined according to the following relationship, $$D = \sqrt{\frac{k}{R} E}$$

The distance D is thus a function of the value R representing the voltage at the terminals of the loops considered of the detection surface. It may be extrapolated from the measurements made. It is to be noted that the accuracy of this distance computation is in particular linked to the stability of the signal E emitted by the solenoid of which the value must be as constant as possible over time, which requires a stabilized supply in the location module which must not drop as the battery discharges. This may be ensured by a voltage regulator of the location module.

While such a solution proves to be very effective for interfacing a set of mobile entities with a surface of small size, there are difficulties in determining the position and/or the orientation of mobile entities relative to surfaces of large size and surfaces of large size which may comprise discontinuous (i.e. unconnected) parts.

The invention enables at least one of the problems set forth above to be solved.

The invention thus relates to a control method in a system comprising a detection surface interfacing a plurality of mobile entities with a computer system, the detection surface comprising a plurality of elementary detection surfaces, the elementary detection surfaces forming at least one group comprising several sub-groups, each sub-group comprising at least one elementary detection surface, each elementary detection surface being configured to determine a position of a mobile entity, it being possible for each mobile entity of the plurality of mobile entities to be activated by a management module associated with a sub-group, the method comprising the following steps, for at least one sub-group, registering at least one mobile entity with the management module of the at least one sub-group, the at least one mobile entity being registered in a list of mobile entity references;

reserving a different period of time for each mobile entity referenced in the list of references, said period of time enabling the activation of a mobile entity and the determination of a position of an activated mobile entity, the reserved periods of time forming a sequence enabling a sequential activation of the mobile entities registered with the management module of said at least one sub-group;

at least one mobile entity being registered with management modules of at least two different sub-groups, the period of time reserved for said at least one mobile entity registered with management modules of at least two different subgroups being the same in each of said at least two subgroups.

The method according to the invention thus enables the management of detection surfaces of various sizes, in particular of large sizes, whether connected or not, enabling the determination in real time of the position of a high number of mobile entities.

According to a particular embodiment, the method further comprises a step of making a comparison of a position of a mobile entity with a predetermined zone and, in response to the comparison, a step of modifying at least one period of time reserved for the mobile entity of which the position has been compared with a predetermined zone.

According to a particular embodiment, said step of modifying at least one reserved period of time comprises the reservation of a new period of time for the mobile entity of which the position has been compared with a predetermined zone, the new period of time being the same as another period of time reserved previously for the mobile entity of which the position is compared with a predetermined zone, the new period of time and the other period of time being reserved in management modules of different sub-groups.

According to a particular embodiment, said step of modifying at least one reserved period of time comprises the cancellation of a period of time previously reserved for the mobile entity of which the position has been compared with a predetermined zone.

According to a particular embodiment, the predetermined zone is a zone comprising part of a first elementary detection surface of a first sub-group and part of a second elementary detection surface of a second sub-group different from the first sub-group.

According to a particular embodiment, the method further comprises a step of synchronizing position computing modules associated with each elementary detection surface of a sub-group.

According to a particular embodiment, the method further comprises a step of activating a mobile entity and a step of determining a position of an activated mobile entity, the activating and determining steps being carried out according to said sequence.

According to a particular embodiment, the step of determining a position of an activated mobile entity comprises a step of measuring a voltage output from a processing circuit connected to each detection loop of a plurality of detection loops of an elementary detection surface, a step of obtaining an impedance of each of the detection loops of the plurality of detection loops and a step of computing a voltage induced at the terminals of each of the detection loops of the plurality of the detection loops according to the impedances obtained and voltage measurements.

According to a particular embodiment, a mobile entity is activated by a radio signal comprising a unique identifier of a mobile entity to activate.

According to a particular embodiment, the method further comprises a step of determining the position of a previously activated mobile entity and a step of sending the determined position to said previously activated mobile entity.

The invention also relates to a detection surface for interfacing a plurality of mobile entities with a computer system, the detection surface comprising a plurality of elementary detection surfaces, the elementary detection surfaces forming at least one group comprising several sub-groups, each sub-group comprising at least one elementary detection surface, each elementary detection surface being configured to determine a position of a mobile entity, it being possible for each mobile entity of the plurality of mobile entities to be activated by a management module associated with a sub-group, each management module associated with a sub-group being configured for:

registering at least one mobile entity in a list of references of mobile entities;

reserving a different period of time for each mobile entity referenced in the list of references, said period of time enabling the activation of a mobile entity and the determination of a position of an activated mobile entity, the reserved periods of time forming a sequence enabling a sequential activation of the mobile entities registered with the management module of said at least one sub-group; management modules associated with sub-groups being furthermore configured such that a same period of time is reserved for a same mobile entity registered with several management modules of at least two different sub-groups.

The surface according to the invention thus enables the implementation of detection surfaces of various sizes, in particular of large sizes, whether connected or not, enabling the determination in real time of the position of a high number of mobile entities.

According to a particular embodiment, at least one elementary detection surface comprises a plurality of detection loops and a position computing module is associated with the at least one elementary detection surface, the position computing module being configured to obtain an impedance for each of the elementary detection loops and to compute a voltage induced at the terminals of each of the detection loops of the plurality of the detection loops according to the obtained impedances.

According to a particular embodiment, a management module associated with a sub-group is furthermore configured to activate a mobile entity by a radio signal comprising a unique identifier of a mobile entity to activate.

The present invention also relates to a computer program comprising instructions adapted for the implementation of at least some of the steps of the method described earlier when said program is executed on a microcontroller. The advantages procured by that computer program are similar to those referred to above in relation to the method.

Other advantages, objects and features of the present invention will emerge from the following detailed description, given by way of non-limiting example, relative to the accompanying drawings in which:

FIG. 1 illustrates an example of a detection surface and of associated logic;

FIG. 2 diagrammatically illustrates the physical principle of inductive coupling between a solenoid and a conductive loop of a detection surface;

FIG. 3 diagrammatically illustrates an interpolation mechanism making it possible to compute the position of a solenoid placed on a detection surface, along a given axis, based on measurements obtained by a system such as that described with reference to FIG. 1;

FIG. 4 diagrammatically illustrates a few detection loops of an elementary detection surface as well as the associated circuits making it possible to determine the position and/or the orientation of a mobile entity provided with a solenoid, taking into account the impedance of the detection loops;

Figure 10:
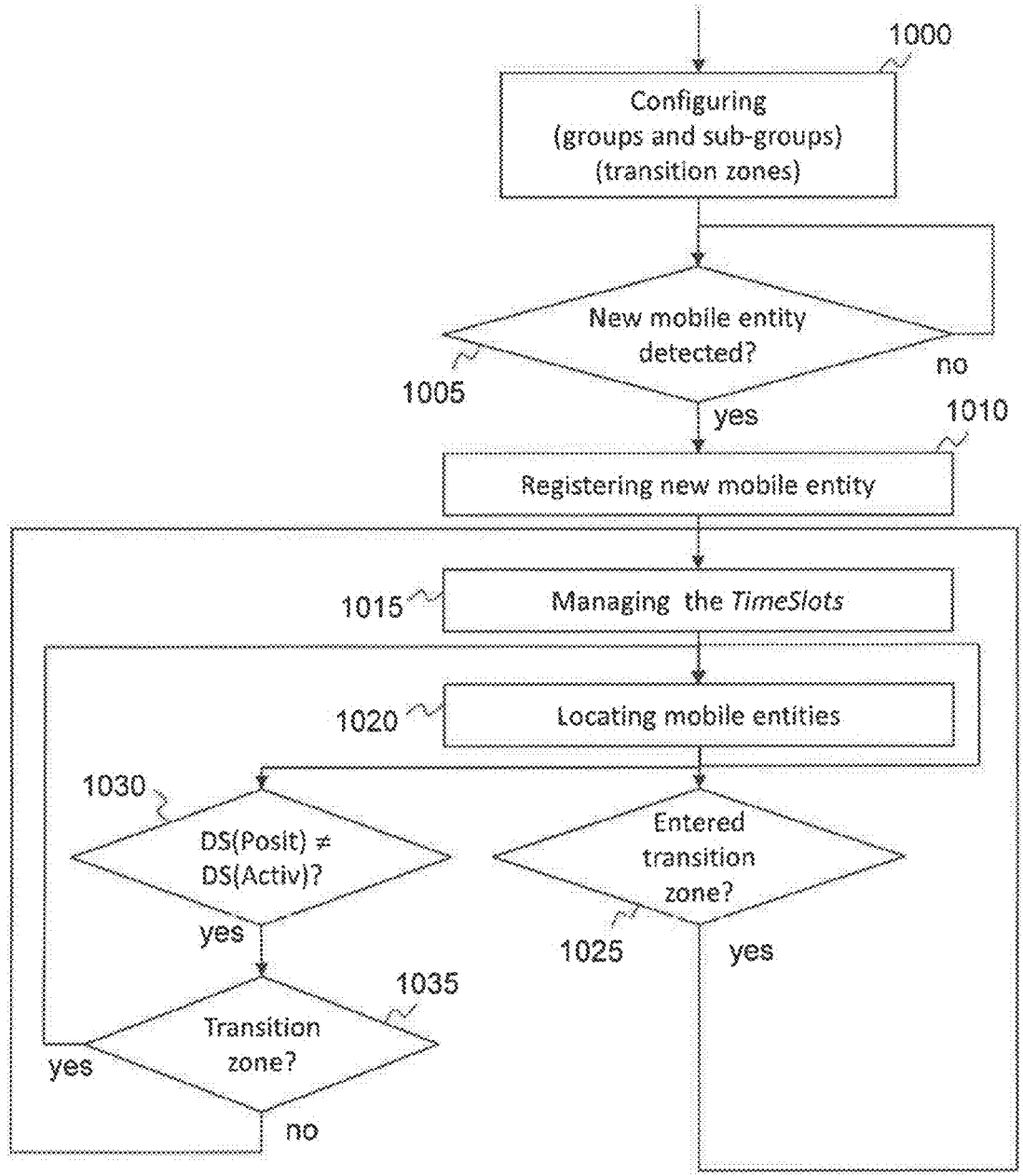
Figure 11:
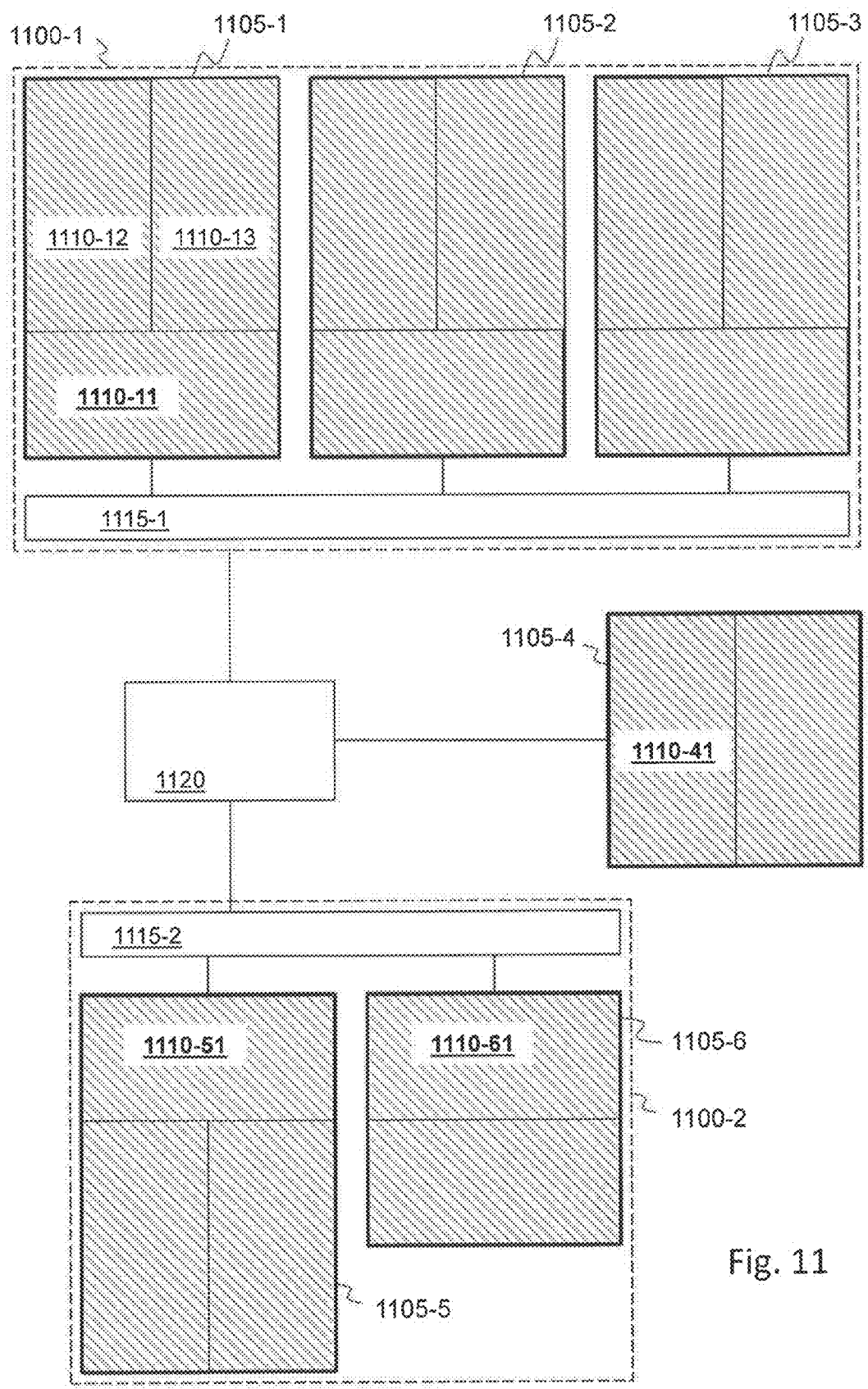
Figure 12:
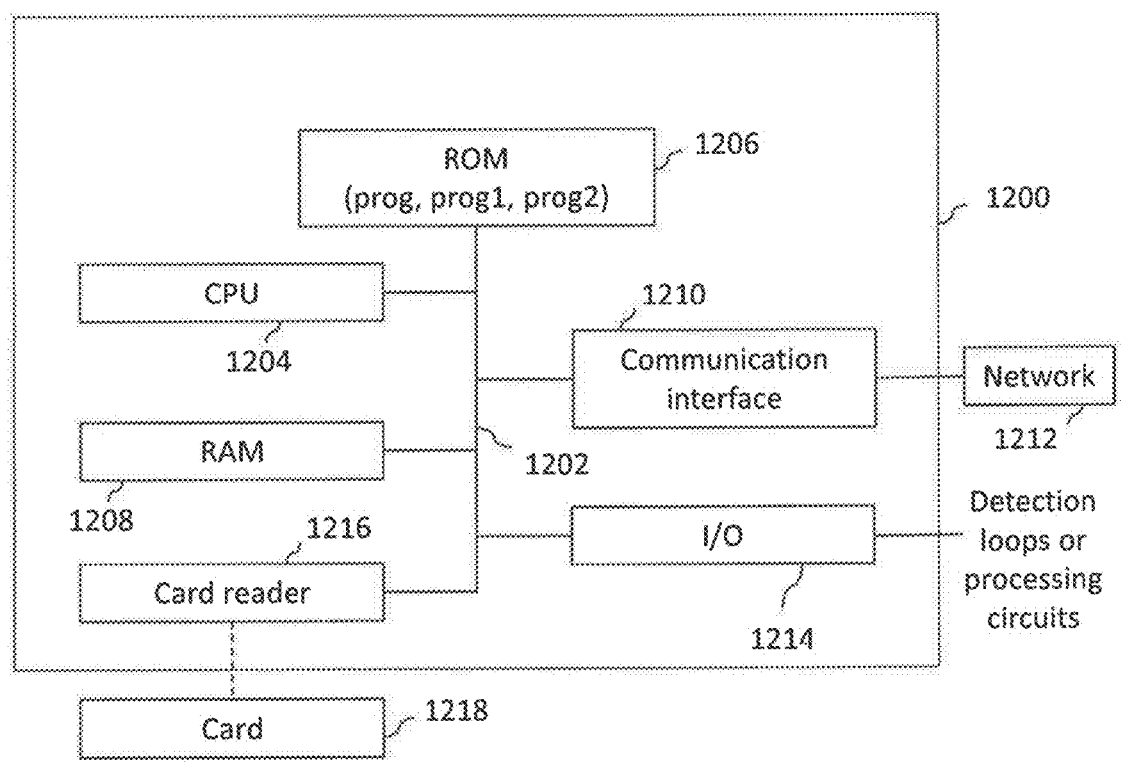

FIG. 9, comprising FIGS. 9a to 9d, illustrates an example of management of TimeSlots and registration of a mobile entity of which the position may be determined by elementary detection surfaces of two sub-groups of a same group;

FIG. 10 illustrates steps of an algorithm for managing the registrations of mobile entities with management modules of sub-groups of elementary detection surfaces;

FIG. 11 illustrates an example of logic architecture of a system for determining the position and/or the orientation of mobile entities placed in the vicinity of a detection surface comprising several elementary detection surfaces organized by sub-groups and groups; and FIG. 12 illustrates an example of architecture of a central module or of a module able to be associated with a master elementary detection surface or with a group.

In general terms, the invention relates to detection surfaces and the management of detection surfaces constituted by several elementary detection surfaces making it possible to determine the position (x coordinate, y coordinate and/or altitude) and/or the orientation (yaw, pitch and/or roll) of mobile entities or pieces disposed thereon and which are used conjointly.

According to particular embodiments, each elementary detection surface comprises a flexible sheet, for example a sheet of plastics material of PET type (PET standing for polyethylene terephthalate), comprising loops formed of a conducting material such as silver. These conducting loops form a mesh (rows and columns) described above, enabling the detection of an electromagnetic field. These loops may in particular be screen-printed, deposited or printed.

The screen-printing of such loops may be carried out by the spreading of a paste such as a paste of silver on the substrate.

The printing may be carried out using a standard ink-jet printing technology, by using a conducting ink, for example an ink charged with particles of silver, in particular silver nanoparticles. It is observed that printing may offer practical advantages such as the unwinding of the flexible substrate and the simultaneous printing of the conducting loops.

According to other embodiments, the detection loops are formed from conducting wires able to be bonded onto the substrate, inserted between layers of the substrate or sewn thereto.

The impedances of the loops obtained according to these methods are substantially equal but may vary from one loop to another, in particular on account of their length. The inventors have observed that, in contrast to loops produced with a copper-based material on surfaces of glass fiber of small size or on equivalent surfaces, they could not be ignored here.

The substrates thus produced may be of large sizes, typically several square meters. By way of illustration, they may be strips of one meter by two.

According to particular embodiments, the impedance of each loop is measured and stored in memory to be used on determining the position and/or the orientation of a solenoid emitting an electromagnetic field. The measurements may be made at the time of the manufacture of the loops or later, during an initialization phase. The values measured may be stored in memory in a table in connection with a reference for the corresponding loops. These references are unique.

Of course, numerous solutions exist for referencing the loops. A simple solution consists of indexing them hierarchically. Thus, for example, when centralized management of the detections is implemented, for a detection surface formed from several groups, each group comprising several sub-groups and each sub-group comprising several elementary detection surfaces, the reference for a loop may comprise a loop index in the elementary detection surface, an elementary detection surface index, a sub-group index and a group index.

Alternatively, when management of detections is implemented for each sub-group, the reference for a loop may comprise a loop index in the elementary detection surface and an elementary detection surface index.

An example of such a table is given in the Appendix (Table 1). As illustrated, the sub-group k comprises M elementary detection surfaces, the first elementary detection surface comprising N1 detection loops, the second elementary detection surface comprising N2 detection loops and so forth. By way of illustration, the measured impedance of the second detection loop of the first elementary detection surface is equal to 600 ohms ($\Omega$). Similarly, still by way of example, the measured impedance of the first detection loop of the elementary detection surface having the index j is equal to 570 ohms.

Figure 1:
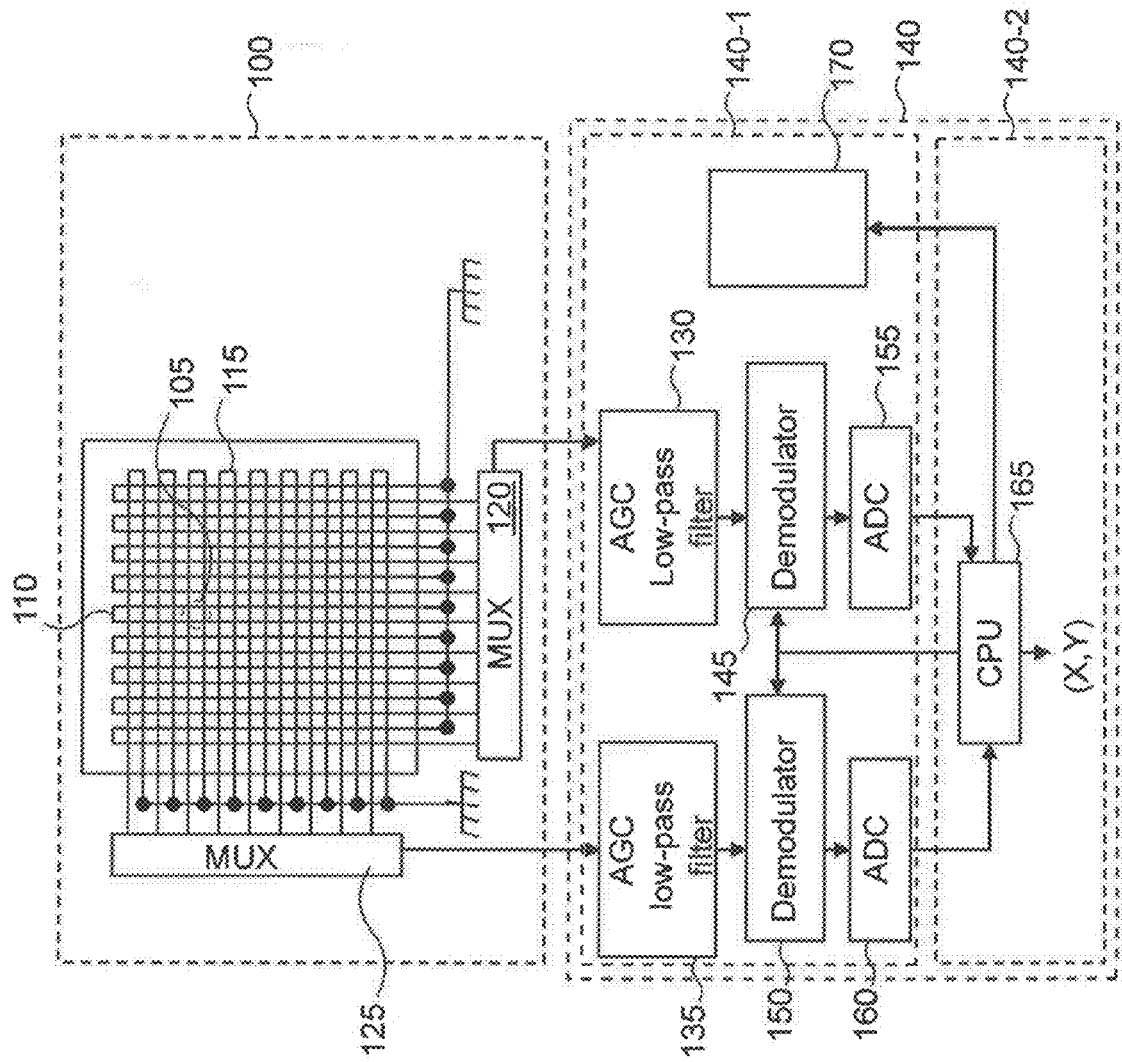
Figure 2:
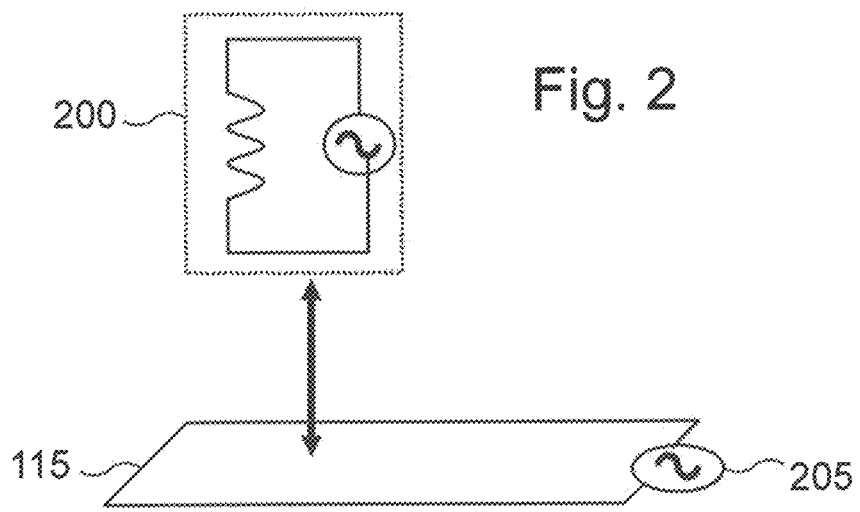
Figure 3:
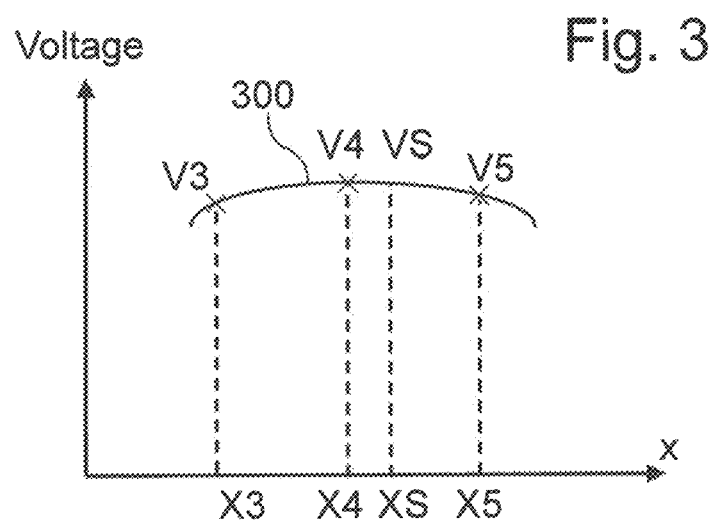

The reading of the electrical signals generated by coupling is made in similar manner to the reading described with reference to FIG. 1, taking into account the impedance of each loop.

Figure 4:
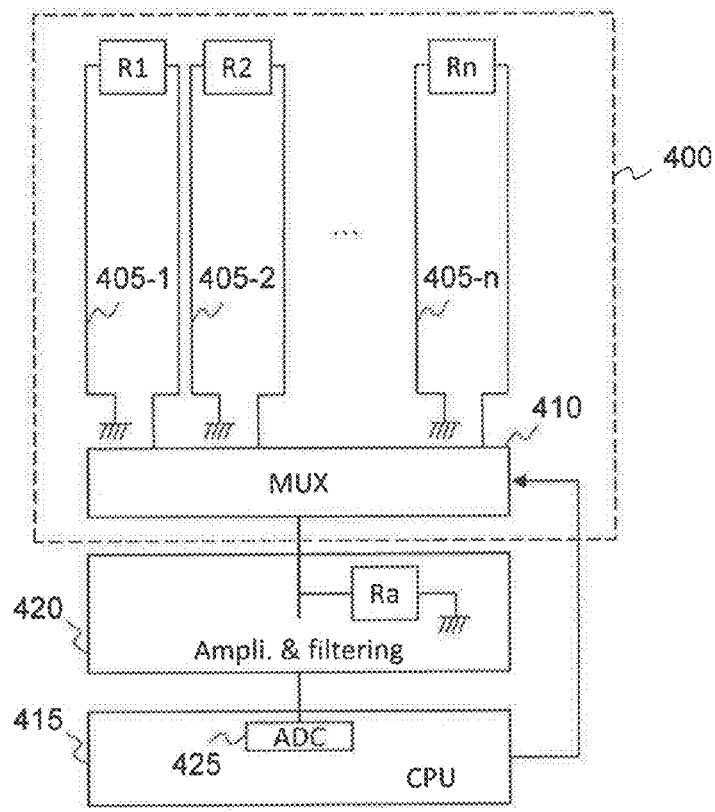

FIG. 4 diagrammatically illustrates a few detection loops of an elementary detection surface as well as the associated circuits making it possible to determine the position and/or the orientation of a mobile entity provided with a solenoid, taking into account the impedance of the detection loops.

By way of illustration, the elementary detection surface 400 comprises n detection loops referenced 405-1 to 405-$n$. Each of these loops has an impedance denoted Ri where i corresponds to the index of the loop. These detection loops are linked to a multiplexer 410, controlled by a central processing unit (CPU) 415. The multiplexer 410 enables the selection of a detection loop such that one of the ends of the selected loop is connected to the output of the multiplexer, the other end of the selected loop being connected to ground.

The output of the multiplexer is connected here to an analog processing module 420 enabling in particular the amplification and the filtering of a signal received from a detection loop. As illustrated, the input of the analog processing module 420 has an impedance Ra. The output of the analog processing module 420 is connected to an analog-digital converter 425 which may be integrated into the central processing unit 415.

The central processing unit 415 is capable of obtaining a measurement of the signals coming from each loop in order to determine the position and/or the orientation of a mobile entity provided with a solenoid.

For these purposes, it is observed that the voltage denoted Vout measured at the output of the analog processing module 420 may be expressed, as a function of a voltage induced at the terminals of the detection loop having the index i (denoted Vind), as follows:

$$Vout = G\frac{Ra}{Ra+Ri}Vind$$

in which G represents the gain of the analog processing chain.

Thus, the inventors have observed that to estimate the position and/or the orientation of a mobile entity in relation to the output voltage (Vout) measured at the output of the analog processing module 420 may on account of it being possible for the impedances to be different in the detection loops, lead to erroneous results.

Therefore, for all the detection loops, the central processing unit 415 computes the induced voltage ($Vind_i$) at the terminals of the selected detection loop (having the index i), this induced voltage being independent from the impedance of the loop, to determine the position and/or the orientation of a mobile entity.

In other words, the position of a mobile entity may be interpolated according to the following formula:

$$XS = X3 + \frac{\Delta X}{2}\frac{3Vind_3 - 4Vind_4 + Vind_5}{3Vind_3 - 2Vind_4 + Vind_5}$$

wherein X3, X4 and X5 are the x-coordinates of the three detection loops B3, B4 and B5, positioned according to the x-coordinates X3, X4 and X5 (considering that AX represents the distance between the x-coordinates X3 and X4 and between the x-coordinates X4 et X5), the induced voltages computed at the terminals of these loops being denoted $Vind_3$, $Vind_4$ and $Vind_5$, respectively. The solenoid is to be found here at a position, along the x-axis, denoted XS.

The voltage $Vind_i$ induced at the terminals of a detection loop i may be expressed as a function of the voltage $Vout_i$ measured at the output from the analog processing module 420 as follows:

$$Vind_i = Vout_i\frac{Ra+Ri}{G \times Ra}$$

It is thus possible to determine the position of a mobile entity according to the measured voltages, taking into account the impedance of each detection loop.

It is observed here that the impedance values of the detection loops may be measured and stored in memory periodically to avoid any drift of the system.

According to particular embodiments, several elementary detection surfaces are combined to extend the surface area of the zone in which the position and/or the orientation of mobile entities may be determined and/or to enable the existence of unconnected zones in which the position and/or the orientation of mobile entities may be determined.

Figure 5:
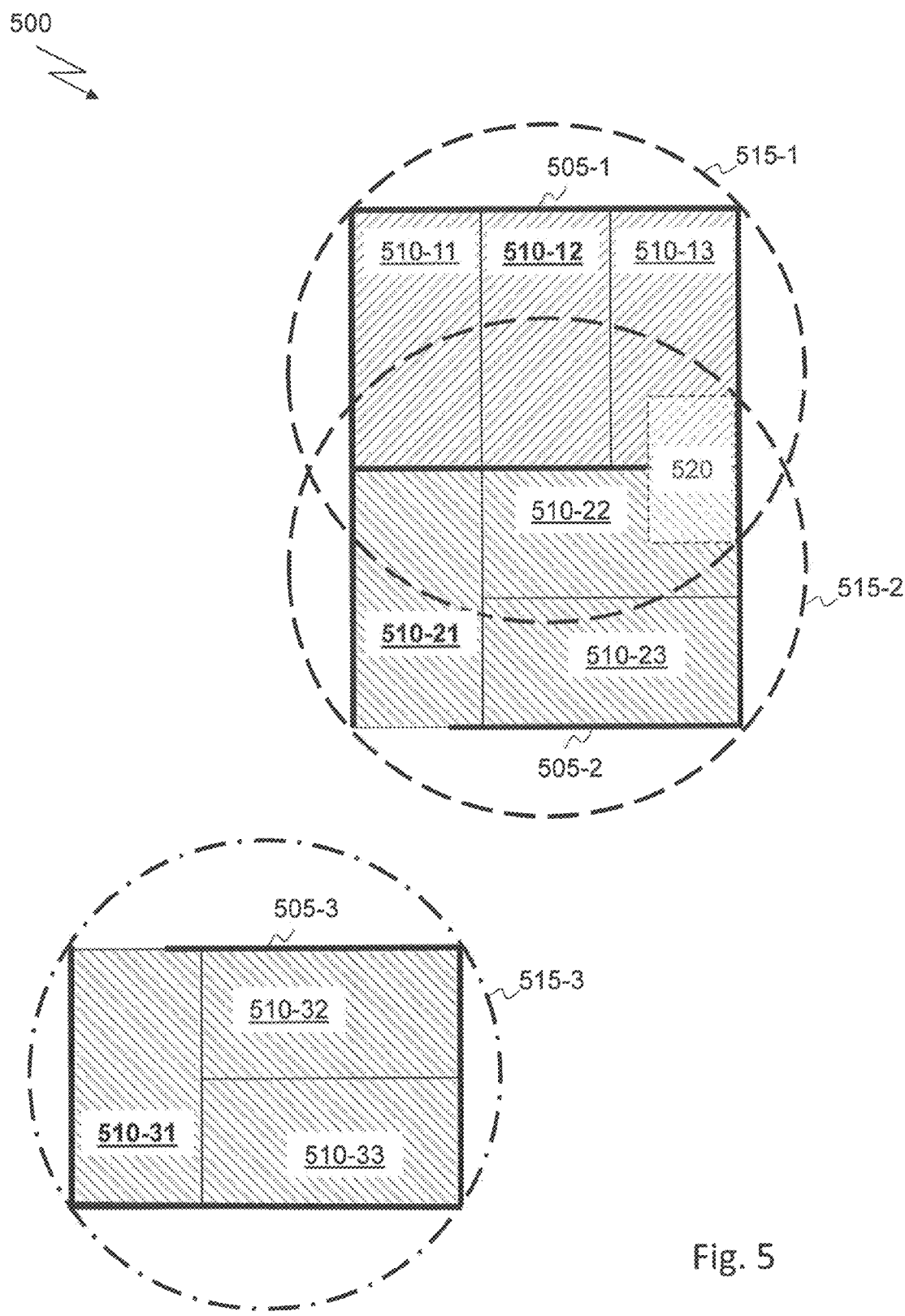
FIG. 5 illustrates an environment 500 in which the position and/or the orientation of mobile entities may be determined using several elementary detection surfaces.

FIG. 5 illustrates an environment 500 in which the position and/or the orientation of mobile entities may be determined using several elementary detection surfaces.

The environment 500 is here a representation of three rooms of a building, referenced 505-1 to 505-3, represented in a horizontal plane. The thick lines correspond to walls. The position and/or the orientation of mobile entities may be determined in each of the rooms 505-1 to 505-3 using elementary detection surfaces grouped into sub-groups and groups.

In the interests of clarity, each sub-group here corresponds to a room. However, according to some embodiments, a room may comprise several sub-groups and, conversely, a sub-group may be associated with several rooms.

Thus, the environment 500 here comprises three sub-groups each associated with one of the rooms 505-1 to 505-3 (in the illustrated example, the references 505-1 to 505-3 thus designate in the same way a room or a sub-group), each sub-group here comprising three elementary detection surfaces.

Thus, for example, the sub-group 505-1 comprises the elementary detection surfaces 510-11 to 510-13. Similarly, the sub-group 505-2 comprises the elementary detection surfaces 510-21 to 510-23 and the sub-group 505-3 comprises the elementary detection surfaces 510-31 to 510-33.

If each sub-group here comprises three elementary detection surfaces, their number may vary from one to several tens. Furthermore, the number of elementary detection surfaces may vary from one sub-group to another.

As illustrated, a mobile entity may pass from the room 505-1 to the room 505-2 by passing through an opening situated at the junction between the detection surfaces 510-13 and 510-22.

According to a particular embodiment, each sub-group comprises an elementary detection surface called master. The other elementary detection surfaces of the sub-group are elementary detection surfaces referred to as slaves. The sequential activation of mobile entities situated in the vicinity of a sub-group is carried out by a management module associated with the master elementary detection surface of that sub-group.

By way of illustration, the master elementary detection surfaces may be elementary detection surfaces 510-12, 510-21 and 510-31 (as suggested by the use of bold characters).

Each sub-group enables the detection of mobile entities situated in the vicinity of the sub-group. Thus, for example, the mobile entities situated in the zone referenced 515-1 may be activated by the management module associated with the master elementary detection surface of sub-group 505-1. Similarly, the mobile entities situated in the zone referenced 515-2 may be activated by the management module associated with the master elementary detection surface of the sub-group 505-2 and the mobile entities in the zone referenced 515-3 may be activated by the management module associated with the master elementary detection surface of the sub-group 505-3.

There may be zones in which a mobile entity may be activated by one sub-group or by another, for example the zone 520. In the latter, a mobile entity may be activated by the management module associated with the master elementary detection surface of the sub-group 505-1 or by the management module associated with the master elementary detection surface of the sub-group 505-2. According to the position of the mobile entity in the zone 520, its position and/or its orientation are determined by the elementary detection surface 510-13 or the elementary detection surface 510-22.

According to a particular embodiment, a mobile entity is registered with a single management module (associated with a master elementary detection surface) when its presence is detected in the vicinity of the detection surface. For these purposes, a registration mechanism similar to the connection mechanisms present in the radio protocol of the type known under the name ANT or ANT+ may, for example, be used.

According to a simplified version of this mechanism, a mobile entity which is not registered with a management module of a master elementary detection surface emits a request capable of being received by one or more management modules (which are associated with master elementary detection surfaces). When the request is received by several management modules, a selection is made in order for the mobile entity to be registered only with a single management module of an master elementary detection surface.

Each management module associated with a master elementary detection surface of a sub-group manages a list of mobile entities to activate.

The sub-groups comprising elementary detection surfaces in contact and enabling the passage of mobile entities from one elementary detection surface of a sub-group to another elementary detection surface of another sub-group, having activation zones in common, form groups. Thus, for example, the sub-groups 505-1 and 505-2 illustrated in FIG. 5 form a first group while the sub-group 505-3 forms a group by itself.

When a mobile entity is registered with a management module of a master elementary detection surface, a radio communication link is established between the mobile entity and the management module. Further to the establishment of this link, a first communicating step consists of obtaining a unique identifier of the mobile entity, for example a unique identifier coded over 24 or 32 bits, then of transmitting to the mobile entity a communication channel reference which it must use to receive activation messages as well as, preferably, a radio channel reference which it must use to receive other types of messages.

As described above, the sequential activation of the mobile entities is managed by a master elementary detection surface. Each activation period, that is to say each period of time comprising the activation of a mobile entity and the measurement of the voltages induced in the corresponding elementary detection surfaces is termed "TimeSlot" (also denoted TS).

The emission of a modulated radio signal encoding the unique identifier of a mobile entity, in the form of an activation message, by a management module associated with a master elementary detection surface activates a single mobile entity.

Such a message is used for selecting a single mobile entity to activate and for synchronizing the time at which that mobile entity must activate its (first) solenoid.

It is observed here that the radio range of a management module of a master elementary detection surface must cover its own surface as well as the slave elementary detection surfaces dependent on that master elementary detection surface.

To synchronize the detection modules of the slave elementary detection surfaces of a sub-group with that of the master elementary detection surface of that sub-group, the detection module or the management module of the master elementary detection surface emits a synchronization signal at the start of each activation sequence (that is to say each activation cycle of the set of the mobile entities of a mobile entity list.

This synchronization signal may be transmitted using the radio means used to transmit messages to the mobile entities in particular activation messages, or by using other communication means, whether wireless or not. This synchronization signal may also come directly from a source shared by all the detection modules of the elementary detection surfaces of a same sub-group.

At each (potential) activation of a mobile entity, that is to say at each activation step of an activation sequence, each elementary detection surface of a same sub-group, whether it be master or slave, seeks to detect the presence of a mobile entity.

Figure 6:
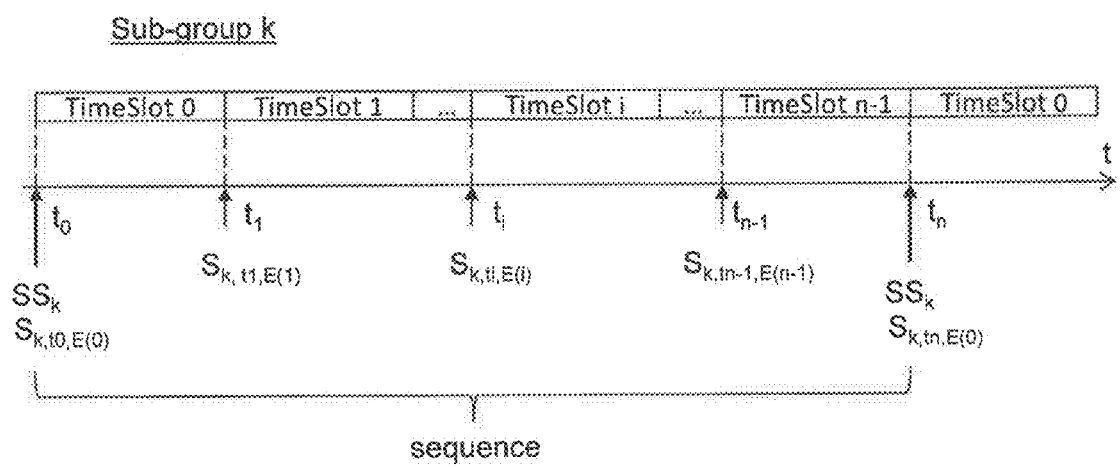
FIG. 6 illustrates a simplified example of a timing diagram for the determination of the position and/or the orientation of mobile entities registered with a management module of a same master elementary detection surface.

FIG. 6 illustrates a simplified example of a timing diagram for the determination of the position and/or the orientation of mobile entities registered with a management module of a same master elementary detection surface, situated in the vicinity of that master elementary detection surface and of slave elementary detection surfaces associated with the latter, these elementary detection surfaces belonging to a same sub-group k.

As illustrated, the time is divided into segments here corresponding to TimeSlots, each segment making it possible to activate a mobile entity and to determine its position and/or its orientation. It is thus possible to determine the position and/or the orientation of a mobile entity E(0), then of a mobile entity E(1) and so forth up to a mobile entity E(n−1) before repeating the sequence to once again determine the position of the mobile entity E(0).

More specifically, at the time $t_0$ (or slightly earlier to take into account the synchronization time), a synchronization signal ($SS_k$) is emitted to synchronize all the elementary detection surfaces of the sub-group k. At the same time or at a time close thereto, an activation signal of the mobile entity E(0), denoted $S_{k,t0,E(0)}$, is emitted. Thus, if the mobile entity E(0) is situated within the range of the management module associated with the master elementary detection surface of the sub-group k, it emits an electromagnetic field capable of creating, through induction, an induced voltage in detection loops of the elementary detection surfaces of the sub-group k or, if applicable, as described below, in detection loops of elementary detection surfaces of other sub-groups situated in the vicinity of the sub-group k.

By way of illustration, voltage measurements (Vout) are made during the TimeSlot 0 to make it possible to determine the position and/or the orientation of the mobile entity E(0), as described above, preferably taking into account impedances of the detection loops. It is observed here that if the measurements of voltages (Vout) are made during the TimeSlot 0, the computation of the position and/or the orientation of the mobile entity E(0) may be continued during the following TimeSlot (TimeSlot 1), when voltage measurements are made to make it possible to determine the position and/or the orientation of the mobile entity E(1), according to a mode known by the name pipeline.

After the position and/or the orientation of the mobile entity E(0) has been determined in each of these elementary detection surfaces, the positions and/or orientations so estimated may be consolidated in a module for computing position and/or orientation associated with each of the sub-groups concerned, in particular in a module for computing position and/or orientation associated with the sub-group k.

Similarly, at the time $t_1$, an activation signal $S_{k,t1,E(1)}$ of the mobile entity E(1) is emitted. Thus, again, if the mobile entity E(1) is situated within the range of the management module associated with the master elementary detection surface of the sub-group k, it emits an electromagnetic field capable of creating, through induction, an induced voltage in detection loops of the elementary detection surfaces of the sub-group k or, if applicable, in detection loops of elementary detection surfaces of other sub-groups situated in the vicinity of the sub-group k.

Similarly, voltage measurements (Vout) are made during the TimeSlot 1 to make it possible to determine the position and/or the orientation of the mobile entity E(1), preferably taking into account impedances of the detection loops.

Again, if the measurements of voltages (Vout) are made during the TimeSlot 1, the computation of the position and/or the orientation of the mobile entity E(1) may be continued during the following TimeSlot (TimeSlot 2), when voltage measurements are made to make it possible to determine the position and/or the orientation of the mobile entity E(2).

In this same period of time and after the position and/or the orientation of the mobile entity E(1) have been determined, the positions and/or orientations so estimated may be consolidated.

As illustrated, this process is repeated for all the mobile entities registered with the sub-group k then is repeated in sequence.

Figure 7:
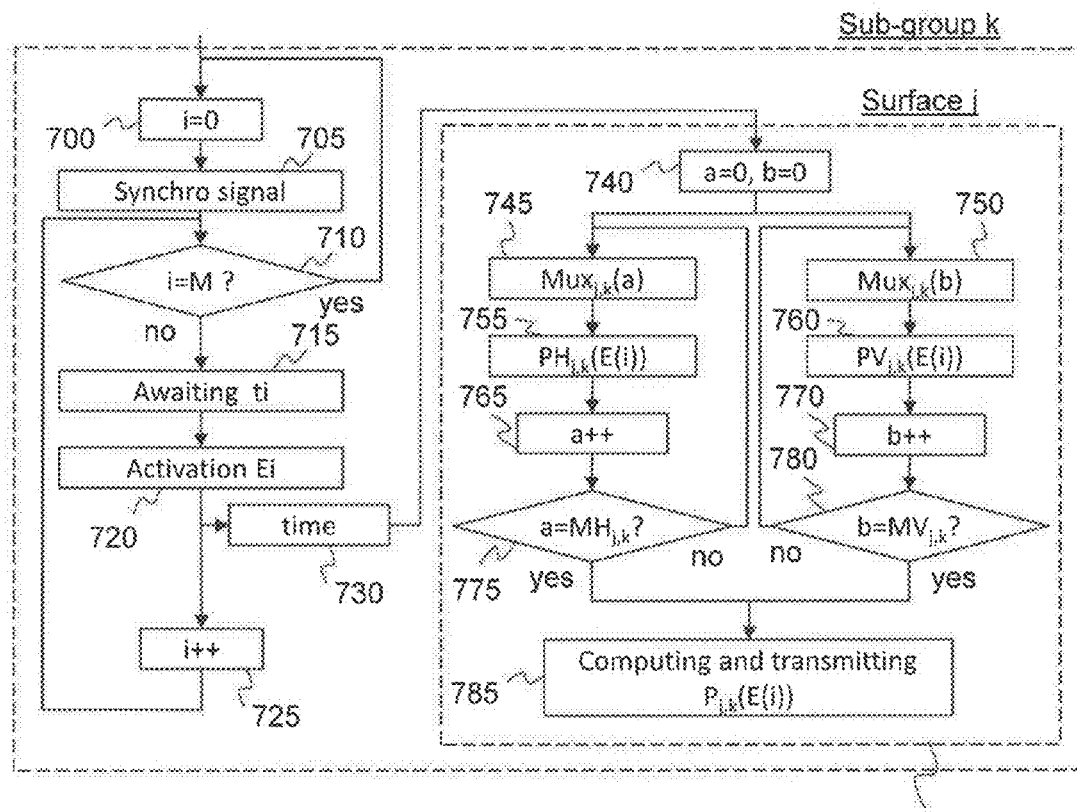
FIG. 7 illustrates certain steps of an algorithm implemented to determine the position of mobile entities situated in the vicinity of elementary detection surfaces of a sub-group k.

FIG. 7 illustrates certain steps of an algorithm implemented to determine the position of mobile entities situated in the vicinity of elementary detection surfaces of a sub-group k.

As illustrated, a first step is directed to initializing a variable i, representing an index on the mobile entities registered with the management module of the master elementary detection surface of the sub-group k, to the value zero (step 700).

A synchronization signal is then emitted to synchronize all the elementary detection surfaces of the sub-group (step 705).

A test is next carried out to determine whether the variable i is equal to the constant M which represents the number of mobile entities registered with the management module of the master elementary detection surface of the sub-group k (step 710).

If the value of the variable i is equal to the constant M, the algorithm loops back to the step of initializing the variable i (step 700), unless the algorithm has been termination.

If, on the contrary, the value of the variable i is not equal to the constant M, a timer is triggered to await the time ti at which an activation signal of the mobile entity i can be emitted (step 715).

At the time ti, an activation signal of the mobile entity E(i) having the index i is emitted (step 720). This activation signal typically comprises a unique identifier of the mobile entity to activate.

The variable i is next incremented by one (step 725) and the algorithm loops back to step 710.

After the emission of an activation signal of the mobile entity E(i) and after a time (730) for activating that mobile entity, the detection and location modules associated with each elementary detection surface of the sub-group k determine the position and/or the orientation of the activated mobile entity, autonomously. The following steps, referenced 735, are thus implemented in each of these modules and, in particular, in a module associated with the elementary detection surface referenced j.

Further to the activation of a mobile entity, that is to say further to the reception of a synchronization signal or in accordance with a predetermined sequencing synchronized with a synchronization signal received beforehand, variables a and b, representing indices relative to the horizontal and vertical detection loops, respectively, of the elementary detection surface j, are initialized to the value zero (step 740).

The multiplexers of the elementary detection surface j (of the sub-group k) are then configured to select the horizontal detection loop having index a (step 745) and the vertical detection loop having index b (step 750).

A measurement of the voltages generated in each of the selected loops is next carried out (steps 755 and 760). These values are stored in memory and the variables a and b are incremented by one (steps 765 and 770). A test is next carried out to determine whether the values of the variables a and b are equal to $MH_{j,k}$ and $MV_{j,k}$, respectively, that is to say to determine whether all the horizontal and vertical detection loops have been selected (steps 775 and 780). The values $MH_{j,k}$ et $MV_{j,k}$, here represent the number of horizontal detection loops and the number of vertical detection loops, respectively, of the elementary detection surface j of the sub-group k.

If not all the horizontal and vertical detection loops have been selected, the steps 745, 755, 765 and 775 and/or the steps 750, 760, 770 and 780 are repeated until all the horizontal and vertical detection loops have been selected and the corresponding voltage measurements have been made.

When all the horizontal and vertical detection loops have been selected, a calculation is made to determine, the case arising, the position $P_{j,k}(E(i))$ and/or the orientation of the selected mobile entity E(i) on the elementary detection surface j of the sub-group k (step 785). This position may be sent to different devices, for example to the mobile entity E(i) itself and to a module for computing a master elementary detection surface in order, for example, for the positions determined by each of the elementary detection surfaces of the sub-group k to be consolidated to determine the position $P_k(E(i))$ of the selected mobile entity. This position may furthermore be transmitted to an application or a system using that position.

It is observed here that according to particular embodiments, the elementary detection surfaces do not overlap. In this case, only the detection loops of a single elementary detection surface are excited by the activated mobile entity (the use of thresholds enables each module for computing position and/or orientation to determine whether the activated mobile entity is in the vicinity or not).

The steps 700 to 725 are thus unique for all the elementary detection surfaces of the sub-group k whereas the steps 740 to 785 are implemented in each of these elementary detection surfaces.

Figure 8:
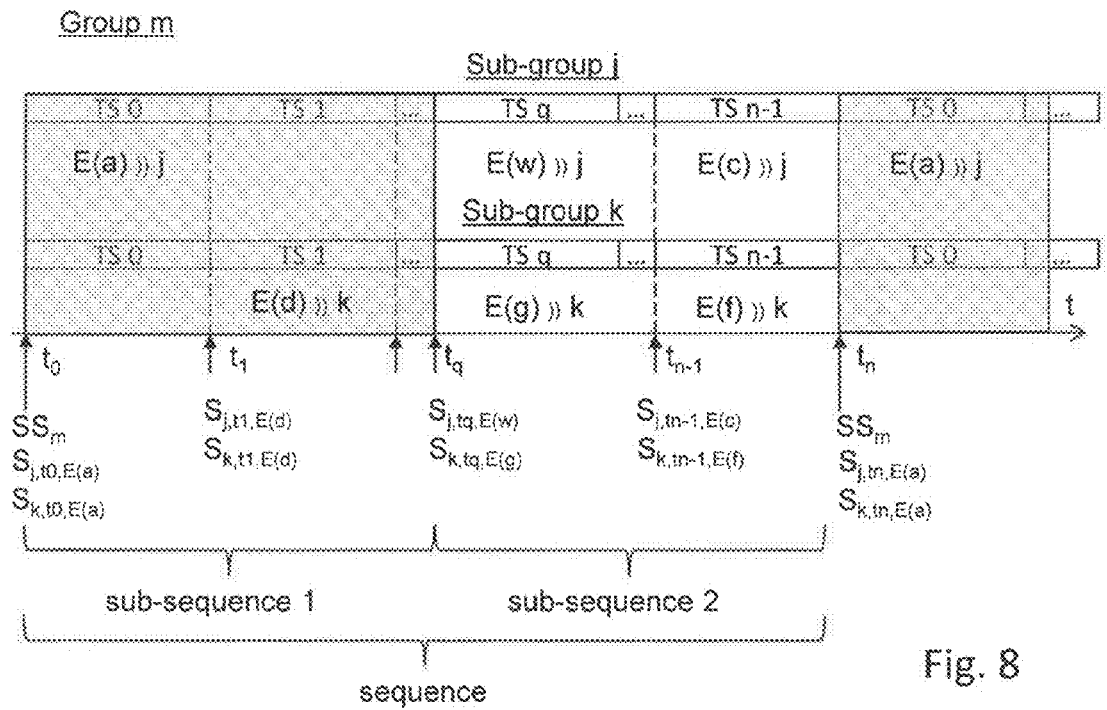
FIG. 8 illustrates a simplified example of a timing diagram for the determination of the position and/or the orientation of mobile entities registered with management modules of master elementary detection surfaces of a same group.

FIG. 8 illustrates a simplified example of a timing diagram for the determination of the position and/or the orientation of mobile entities registered with management modules of master elementary detection surfaces of a same group.

The diagram illustrated concerns a group m comprising two sub-groups j and k, for example the sub-groups 505-1 and 505-2 illustrated in FIG. 5.

As in the timing diagram illustrated in FIG. 6, the time is divided into TimeSlots, each TimeSlot corresponding to a period of time making it possible to activate a mobile entity and carry out measurements of voltages enabling its position (and/or its orientation) to be determined.

The period of time corresponds to a full sequence of interrogating the mobile entities and is divided here into two elementary periods called sub-sequences.

According to particular embodiments, during the first sub-sequence, at the start of each TimeSlot, management modules associated with master elementary detection surfaces of the sub-groups concerned simultaneously emit activation messages to the same mobile entity. During the second sub-sequence, the management modules associated with the master elementary detection surfaces of the group concerned simultaneously emit, at the start of each TimeSlot, activation messages to the mobile entities registered exclusively in their sub-group.

Thus, according to these embodiments, at the time $t_0$, at the start of the first sub-sequence, or slightly afterwards, a synchronization signal ($SS_m$) is emitted to synchronize all the elementary detection surfaces of the sub-groups of the group m, notably the sub-groups j and k. At the same time or at a time close to it, activation signals Sj,t0,E(a) and Sk,t0,E(a) are emitted by the management modules of the master elementary detection surfaces of the sub-groups j and k, respectively, to activate the mobile entity E(a). Thus, if the mobile entity E(a) is situated in the vicinity of one of these modules, it can emit an electromagnetic field capable of creating, by induction, an induced voltage in the detection loops of the elementary detection surfaces of the group m.

The measurements of the voltages Vout produced by the mobile entity E(a) is then made during the TimeSlot 0 (TS 0), in each of these elementary detection surfaces as described above, taking into account, preferably, impedances of the detection loops. In this same period of time or in a following period of time, the position and/or the orientation of the mobile entity E(a) are determined by these elementary detection surfaces. As illustrated with the reference E(a))) j, the position of the mobile entity E(a) is here determined by the sub-group j (no mobile entity position has been detected by the sub-group k).

Similarly, at the time $t_1$, activation signals Sj,t1,E(d) and Sk,t1,E(d) are emitted by the management modules of the master elementary detection surfaces of the sub-groups j and k, respectively, to activate the module E(d). Thus, again, if the mobile entity E(d) is situated in the vicinity of one of these modules, it emits an electromagnetic field capable of creating, by induction, an induced voltage in the detection loops of the elementary detection surfaces of the group m.

Again, a measurement of the voltages Vout produced by the mobile entity E(a) is carried out during the TimeSlot 1 (TS 1) to enable the determination of the position and/or the orientation of the mobile entity E(d) during that TimeSlot or later. The position and/or the orientation of the mobile entity E(d) may next be consolidated. As illustrated with the reference E(d))) k, the position of the mobile entity E(d) is here determined by the sub-group k (no mobile entity position has been detected by the sub-group j).

At the time $t_q$, corresponding here to the start of the second sub-sequence, different activation signals Sj,tq,E(w) and Sk,tq,E(g) are emitted by the management modules of the master elementary detection surfaces of the sub-groups j and k, respectively. Thus, the management module of the master elementary detection surface of the sub-group j activates the mobile entity E(w) whereas the management module of the master elementary detection surface of the sub-group k activates the mobile entity E(g).

Thus, as illustrated with the reference E(w))) j, if the mobile entity E(w) is situated in the vicinity of the management module associated with the master elementary detection surface of the sub-group j, it emits an electromagnetic field capable of creating, by induction, an induced voltage in detection loops of the elementary detection surfaces of the group m, here of the sub-group j. Similarly, as illustrated with the reference E(g))) k, if the mobile entity E(g) is situated in the vicinity of the management module associated with the master elementary detection surface of the sub-group k, it emits an electromagnetic field capable of creating, by induction, an induced voltage in the detection loops of the elementary detection surfaces of the group m, here of the sub-group k.

The position and/or the orientation of the mobile entities E(w) and E(g) are determined during the TimeSlot q (TS q) and, possibly, during a portion of the following TimeSlot (TS q+1).

This process is repeated for all the mobile entities registered with the sub-groups of the group m then is repeated in sequence.

According to particular embodiments, the management of the TimeSlots of the first sub-sequences is carried out by a management module associated with each group comprising several sub-groups. This management module may in particular be the management module associated with the master elementary detection surface of the sub-groups of the group concerned. The management of the TimeSlots of the second sub-sequences may be carried out directly by the management modules of the master elementary detection surfaces.

It is observed here that, according to particular embodiments, the messages for activation of a mobile entity by several distinct sub-groups of a same group, during the first sub-sequence, may be emitted simultaneously. These signals may be emitted over a same channel.

Alternatively, the activation messages may be transmitted over different channels, the mobile entities then being parameters, during a registering phase, to listen to the activation messages corresponding to the strongest signals received.

Also alternatively, the activation messages may be transmitted over different channels, the mobile entities then being parameterized, during a registering phase, to select a channel and listen to the corresponding activation messages according to the relative position of the mobile entity and of the sub-groups, for example by choosing a sub-group minimizing that relative distance.

FIG. 9, comprising FIGS. 9a to 9d, illustrates an example of management of TimeSlots and registration of a mobile entity of which the position may be determined by elementary detection surfaces of two sub-groups of a same group.

As illustrated in FIG. 9a, the detection environment here comprises a first elementary detection surface of a first sub-group (SG1) and a second elementary detection surface of a second sub-group (SG2). A mobile entity 900 may move from the first elementary detection surface to the second via a transition zone (TZ) and vice-versa.

By way of illustration, it is accepted here that the mobile entity 900 is initially registered only with the management module associated with the master elementary detection surface of the sub-group SG1 Therefore, the mobile entity 900 may be activated by the management module associated with the master elementary detection surface of the sub-group SG1 (as represented by the rectangle in dashed bold line).

Thus, when the management module associated with the master elementary detection surface of the sub-group SG1 sequentially activates the mobile entities registered with it, it first of all interrogates, if applicable, the mobile entities registered with several management modules associated with master detection surfaces (first sub-sequence) then the mobile entities solely registered with the management module associated with the master elementary detection surface of the sub-group SG1, including the mobile entity 900, as illustrated in FIG. 9a under the representation of the sub-groups SG1 and SG2, in the form of a timing diagram for the TimeSlots.

When the mobile entity 900 moves in the zone SG1 to enter the transition zone TZ, as illustrated in FIG. 9b, obtaining its position makes it possible to determine whether it is located in the transition zone TZ between the sub-groups SG1 and SG2 (this transition zone typically being determined during a configuration step). This information is addressed to the management module associated with the master elementary detection surface of the sub-group SG2 which registers the mobile entity 900 on its list. The mobile entity 900 being registered with two sub-groups of the same group, a specific TimeSlot is assigned to this mobile entity in the first sub-sequence of the activation sequences of the sub-groups SG1 and SG2.

Thus, the management modules associated with the master elementary detection surfaces of the sub-groups SG1 and SG2 attempt to activate the mobile entity 900 at the same time, as illustrated in FIG. 9b, under the representation of the sub-groups SG1 and SG2. The position of the mobile entity 900 here is still determined by the master elementary detection surface of the sub-group SG1.

When the mobile entity 900 moves from the zone referenced SG1 to the zone referred SG2, while remaining in the transition zone TZ, as illustrated in FIG. 9c, it continues to be activated by the management modules associated with the master elementary detection surfaces of the sub-groups SG1 and SG2. However, the position of the mobile entity 900 here is now determined by the master elementary detection surface of the sub-group SG2.

Lastly, as illustrated in FIG. 9d, the mobile entity 900 leaves the transition zone TZ, while remaining in the zone SG2. The position and/or the orientation of the mobile entity 900 are then still determined by the master elementary detection surface of the sub-group SG2 after that mobile entity has been activated.

The information that the mobile entity 900 is leaving the transition zone is transmitted here to the management module associated with the master elementary detection surface of the sub-group SG1 which activated that mobile entity but did not determine its position. The management module associated with the master elementary detection surface SG1 then decides to remove it from its list of sub-groups to activate.

The mobile entity 900 then only being registered with a management module of a single master elementary detection surface, the TimeSlot which is associated with it is modified: a standard TimeSlot, specific to the sub-group SG2 assigned to it (in the second sub-sequence of the activation sequence of the sub-group SG2), as illustrated in FIG. 9d under the representation of the sub-groups SG1 and SG2.

FIG. 10 illustrates steps of an algorithm for managing the registrations of mobile entities with management modules of sub-groups of elementary detection surfaces.

A first step (step 1000) is directed here to configuring the system, in particular to determine the sub-groups and the groups as well as to determine the transition zones. According to a particular embodiment, a common frame of reference is determined, at least per group, in order to simplify the management of the positions of the mobile entities, in particular relative to the transition zones.

In a following step (step 1005), it is determined whether registration requests have been received from one or more mobile entities. This step is, preferably, carried out continuously, as a background task, to enable the registration of new mobile entities.

If at least one mobile entity is detected, it is registered with a management module associated with the master elementary detection surface of a sub-group (step 1010). As described above, this initial registration phase may be carried out in standard manner, for example using the connection mechanism present in the radio protocol of the type known under the name ANT or ANT+.

In a following step, the TimeSlots enabling each mobile entity to be activated sequentially, within each sub-group, are determined (step 1015).

For these purposes, the mobile entities registered with management modules associated with master elementary detection surfaces of sub-groups of a same group are identified in order to enable the reservation of corresponding TimeSlots for each of the sub-groups concerned.

Thus, for example, a mobile entity registered with management modules associated with the master elementary detection surfaces of sub-groups SG1 and SG2 of a same group will have TimeSlots defined for them that are equivalent (that is to say having a same start time) in the management modules associated with the master elementary detection surfaces of the sub-groups SG1 and SG2. These TimeSlots are defined in the first sub-sequence of the corresponding sequences.

TimeSlots specific to each management module are next attributed to the mobile entities registered with a single management module (associated with a single master elementary detection surface).

After TimeSlots have been defined, it is possible to sequentially activate the registered mobile entities in order to determine their position and/or orientation (step 1020) as described above.

When the position of a mobile entity has been determined (or after having determined the position of several mobile entities, for example all the mobile entities registered with a sub-group), the mobile entity or mobile entities having entered a transition zone are, if the case arises, identified (step 1025) by comparing their position with the locations of the transition zones.

For each mobile entity that has entered a transition zone, a message is addressed to the management modules associated with the master elementary detection surfaces of the sub-groups of which elementary detection surfaces overlap with the transition zone considered. A specific TimeSlot is then created in order for these management modules simultaneously to activate each of these mobile entities, as described with reference to FIG. 9b.

For these purposes, the algorithm loops to step 1015 of managing TimeSlots.

Furthermore, when the position of a mobile entity has been determined (or after having determined the position of several mobile entities, for example all the mobile entities registered with a sub-group), a test is carried out to determine whether, for that or those mobile entities, the master elementary detection surface of which the management module has activated the mobile entity or mobile entities (for each of those surfaces) is the same as the master elementary detection surface which enabled the position to be determined of that or those mobile entities (step 1030).

In the affirmative and when the mobile entity concerned is not located in a transition zone (step 1035), a message is addressed to the management modules associated with the master the elementary detection surfaces that activated the mobile entity or mobile entities concerned in order for the mobile entities to be removed from some lists and the TimeSlots, if applicable, to be redefined. If the mobile entity or the mobile entities concerned are, after this operation, only registered on a single list, TimeSlots specific to the sub-groups concerned are then attributed to that mobile entity or those mobile entities, as described with reference to FIG. 9d.

For these purposes, the algorithm loops to step 1015 of managing TimeSlots.

FIG. 11 illustrates an example of logic architecture of a system for determining the position and/or the orientation of mobile entities placed in the vicinity of a detection surface comprising several elementary detection surfaces organized by sub-groups and groups.

As illustrated, the detection surface here comprises three groups of elementary detection surfaces.

The first group, referenced 1100-1, comprises three sub-groups referenced 1105-1 to 1105-3. Each of these sub-groups here comprises three elementary detection surfaces among which is a master elementary detection surface and two slave elementary detection surfaces. By way of illustration, the sub-group 1105-1 comprises the master elementary detection surface 1110-11 as well as the slave elementary detection surfaces 1110-12 and 1110-13.

The sub-group 1105-4, comprising two elementary detection surfaces including the master elementary detection surface 1110-41, constitutes a group by itself.

Furthermore, the group referenced 1100-2 comprises two sub-groups referenced 1105-5 to 1105-6, the sub-group 1105-5 here comprising three elementary detection surfaces and the sub-group 1105-6 comprising two of them, including the master elementary detection surfaces 1110-51 and 1110-61, respectively.

A module is associated with each group comprising more than one sub-group to manage, in particular, the TimeSlots. Thus, the module 1115-1 is associated with the group 1100-1 and the module 1115-2 is associated with the group 1100-2. It is observed here that such a module may be integrated in the management module associated with the master elementary detection surface of one of the sub-groups of the group considered.

The modules 1115-1 and 1115-2 furthermore make it possible to consolidate positions and/or orientations determined within sub-groups of the group considered.

Lastly, a central module referenced 1120 makes it possible to control the system, in particular to centralize the positions and/or orientations determined for each of the mobile entities detected.

This central module may be integrated into a module associated with a group or in a management module associated with a master elementary detection surface.

The central module and the modules associated with the groups are used, in particular, to manage the TimeSlots.

Thus, for example, when a management module associated with a master elementary detection surface receives location signals of a mobile entity and if that management module has not reserved any TimeSlot for that mobile entity, it indicates this to the module of the group to which it belongs. This indication preferably comprises the position of the mobile entity and a unique identifier of the sub-group having determined the position of that mobile entity.

The module associated with the group then communicates this information to the management module of the master elementary detection surface which attributed a TimeSlot to that mobile entity. According to whether the position of the mobile entity is located within a transition zone or not, a common TimeSlot, in the first sub-sequence, is attributed by the management module associated with the master elementary detection surface which received location signals of the mobile entity and by the management module of the master elementary detection surface which had attributed a TimeSlot to that mobile entity, or, alternatively, the management module of the master elementary detection surface which had attributed a TimeSlot to that mobile entity frees that TimeSlot to attribute it later to another mobile entity.

FIG. 12 illustrates an example of architecture of a central module or of a module able to be associated with a master elementary detection surface or with a group.

The device 1200 preferably comprises a communication bus 1202 to which are connected:
- a central processing unit (CPU) or microprocessor 1204;
- a read only memory 1206 (ROM) able to include an operating system and programs such as "Prog";
- a Random Access Memory (RAM) or cache memory 1208, comprising registers adapted to record variables and parameters created and modified during the execution of the aforementioned programs; and
- a communication interface 1210 connected to a distributed communication network 1212, for example a wireless communication network and/or a local communication network, the interface being adapted to transmit and to receive data, in particular to or from another module and/or to or from a computer, a tablet or a smartphone. When the device 1200 is used as a management module associated with a master elementary detection surface, the communication interface 1210 may also enable activation of the mobile entities.

Optionally, the device 1200 may also have the following items:
- an input/output interface 1214 making it possible to receive data from detection loops or from detection loops or circuits for processing measurements of detection loops; and/or
- a reader 1216 for a removable storage medium 1218 such as a memory card.

The communication bus allows communication and interoperability between the different elements included in the device 1200 or connected to it. The representation of the bus is non-limiting and, in particular, the central processing unit may communicate instructions to any element of the device 1200 directly or by means of another element of the device 1200.

The executable code of each program enabling the programmable device to implement the processes according to the invention, in particular to manage TimeSlots and/or determine positions of mobile entities, may be stored, for example, in the read only memory 1206.

According to a variant, the executable code of the programs can be received by the intermediary of the communication network 1212, via the interface 1210, in order to be stored in an identical fashion to that described previously.

More generally, the program or programs may be loaded into one of the storage means of the device 1200 before being executed.

The central processing unit 1204 will control and direct the execution of the instructions or portions of software code of the program or programs according to the invention, the instructions being stored, for example, in the read only memory 1206 or in the other aforementioned storage elements. On powering up, the program or programs which are stored in a non-volatile memory, for example the read only memory 1206, are transferred into the random access memory 1208, which then contains the executable code of the program or programs according to the invention, as well as registers for storing the variables and parameters necessary for implementation of the invention.

Naturally, to satisfy specific needs, a person competent in the field of the invention will be able to apply modifications to the preceding description. The present invention is not limited to the described embodiments, other variants and combinations of features are possible.

The present invention has been described and illustrated in the present detailed description with reference to the appended Figures. However, the present invention is not limited to the embodiments presented. Other variants and embodiments may be deduced and implemented by the person competent in the field of the invention on reading the present description and appended Figures.

In the claims, the term "comprise" does not exclude other elements or other steps. The indefinite article "a" does not exclude the plural. A single processor or several other units may be used to implement the invention. The different features presented and/or claimed may advantageously be combined. Their presence in the description or in different dependent claims, does not indeed exclude the possibility of combining them. The reference signs are not to be understood as limiting the scope of the invention.

APPENDICES

TABLE 1 impedances of the loops of a sub-system k of a detection surface comprising M elementary detection surfaces, an elementary detection surface i comprising Ni detection loops.
Sub-group k

| Elementary surface index | Loop index | Impedance ($\Omega$) |
|---|---|---|
| 1 | 1 | 520 |
| 1 | 2 | 600 |
| ... | ... | ... |
| 1 | i | 480 |
| ... | ... | ... |
| 1 | N1 | 550 |
| 2 | 1 | 610 |
| 2 | 2 | 530 |
| ... | ... | ... |
| 2 | N2 | 500 |
| ... | ... | ... |
| j | 1 | 570 |
| ... | ... | ... |
| M | 1 | 490 |
| ... | ... | ... |
| M | Nm | 515 |

The invention claimed is:

1. A control method in a system comprising a detection surface interfacing a plurality of mobile entities with a computer system, the detection surface comprising a plurality of elementary detection surfaces (1110-11, 1110-12, 1110-13), the elementary detection surfaces forming at least one group (1100-1) comprising several sub-groups (1105-1, 1105-2, 1105-3), each sub-group comprising at least one elementary detection surface, each elementary detection surface being configured to determine a position of a mobile entity, it being possible for each mobile entity of the plurality of mobile entities to be activated by a management module associated with a sub-group, the method comprising the following steps,
for at least one sub-group,
registering (1010) at least one mobile entity with the management module of the at least one sub-group, the at least one mobile entity being registered in a list of mobile entity references;
reserving (1015) a different period of time for each mobile entity referenced in the list of references, said period of time enabling the activation of a mobile entity and the determination of a position of an activated mobile entity, the reserved periods of time forming a sequence enabling a sequential activation of the mobile entities registered with the management module of said at least one sub-group;
at least one mobile entity being registered with management modules of at least two different sub-groups, the period of time reserved for said at least one mobile entity registered with management modules of at least two different sub-groups being the same in each of said at least two sub-groups.

2. A method according to claim 1, further comprising a step of making a comparison of a position of a mobile entity with a predetermined zone and, in response to the comparison, a step of modifying at least one period of time reserved for the mobile entity of which the position has been compared with a predetermined zone.

3. A method according to claim 2, wherein said step of modifying at least one reserved period of time comprises the reservation of a new period of time for the mobile entity of which the position has been compared with a predetermined zone, the new period of time being the same as another period of time reserved previously for the mobile entity of which the position has been compared with a predetermined zone, the new period of time and the other period of time being reserved in management modules of different sub-groups.

4. A method according to claim 3, wherein the predetermined zone is a zone comprising part of a first elementary detection surface of a first sub-group and part of a second elementary detection surface of a second sub-group different from the first sub-group.

5. A method according to claim 3, further comprising a step of synchronizing position computing modules associated with each elementary detection surface of a sub-group.

6. A method according to claim 3, further comprising a step of activating a mobile entity and a step of determining a position of an activated mobile entity, the activating and determining steps being carried out according to said sequence.

7. A method according to claim 2, wherein said step of modifying at least one reserved period of time comprises the cancellation of a period of time previously reserved for the mobile entity of which the position has been compared with a predetermined zone.

8. A method according to claim 7, wherein the predetermined zone is a zone comprising part of a first elementary detection surface of a first sub-group and part of a second elementary detection surface of a second sub-group different from the first sub-group.

9. A method according to claim 2, wherein the predetermined zone is a zone comprising part of a first elementary detection surface of a first sub-group and part of a second elementary detection surface of a second sub-group different from the first sub-group.

10. A method according to claim 2, further comprising a step of synchronizing position computing modules associated with each elementary detection surface of a sub-group.

11. A method according to claim 2, further comprising a step of activating a mobile entity and a step of determining a position of an activated mobile entity, the activating and determining steps being carried out according to said sequence.

12. A method according to claim 1, further comprising a step of synchronizing position computing modules associated with each elementary detection surface of a sub-group.

13. A method according to claim 1, further comprising a step of activating a mobile entity and a step of determining a position of an activated mobile entity, the activating and determining steps being carried out according to said sequence.

14. A method according to claim 13, wherein the step of determining a position of an activated mobile entity comprises a step of measuring a voltage output from a processing circuit connected to each detection loop of a plurality of detection loops of an elementary detection surface, a step of obtaining an impedance of each of the detection loops of the plurality of detection loops and a step of computing a voltage induced at the terminals of each of the detection loops of the plurality of the detection loops according to the impedances obtained and voltage measurements.

15. A method according to claim 1, wherein a mobile entity is activated by a radio signal comprising a unique identifier of a mobile entity to activate.

16. A method according to claim 1, further comprising a step of determining the position of a previously activated mobile entity and a step of sending the determined position to said previously activated mobile entity.

17. A detection surface for interfacing a plurality of mobile entities with a computer system, the detection surface comprising a plurality of elementary detection surfaces (1110-11, 1110-12, 1110-13), the elementary detection surfaces forming at least one group (1100-1) comprising several sub-groups (1105-1, 1105-2, 1105-3), each sub-group comprising at least one elementary detection surface, each elementary detection surface being configured to determine a position of a mobile entity, it being possible for each mobile entity of the plurality of mobile entities to be activated by a management module associated with a sub-group, each management module associated with a sub-group being configured for:

registering (1010) at least one mobile entity in a list of references of mobile entities;

reserving (1015) a different period of time for each mobile entity referenced in the list of references, said period of time enabling the activation of a mobile entity and the determination of a position of an activated mobile entity, the reserved periods of time forming a sequence enabling a sequential activation of the mobile entities registered with the management module of said at least one sub-group;

management modules associated with sub-groups being furthermore configured such that a same period of time is reserved for a same mobile entity registered with several management modules of at least two different sub-groups.

18. A detection surface according to claim 17 wherein at least one elementary detection surface comprises a plurality of detection loops and a position computing module is associated with the at least one elementary detection surface, the position computing module being configured to obtain an impedance for each of the elementary detection loops and to compute a voltage induced at the terminals of each of the detection loops of the plurality of the detection loops according to the obtained impedances.

19. A detection surface according to claim 18 wherein a management module associated with a sub-group is furthermore configured to activate a mobile entity by a radio signal comprising a unique identifier of a mobile entity to activate.

20. A detection surface according to claim 17 wherein a management module associated with a sub-group is furthermore configured to activate a mobile entity by a radio signal comprising a unique identifier of a mobile entity to activate.

* * * * *